(12) United States Patent
Shiga et al.

(10) Patent No.: US 11,316,894 B1
(45) Date of Patent: Apr. 26, 2022

(54) SYSTEM AND METHOD FOR DETECTING LEAKAGE OF EMAIL ADDRESSES

(71) Applicant: Trend Micro Incorporated, Tokyo (JP)

(72) Inventors: Tomoyuki Shiga, Tokyo (JP); Machika Mase, Tokyo (JP); Hiroshi Hasegawa, Tokyo (JP)

(73) Assignee: Trend Micro Incorporated, Tokyo (JP)

( * ) Notice: Subject to any disclaimer, the term of this patent is extended or adjusted under 35 U.S.C. 154(b) by 357 days.

(21) Appl. No.: 16/558,622

(22) Filed: Sep. 3, 2019

(51) Int. Cl.
H04L 51/42 (2022.01)
H04L 29/06 (2006.01)

(52) U.S. Cl.
CPC .......... H04L 63/1475 (2013.01); H04L 51/22 (2013.01); H04L 63/1416 (2013.01); H04L 63/1483 (2013.01)

(58) Field of Classification Search
CPC ............. H04L 63/1475; H04L 63/1483; H04L 63/1416; H04L 51/22
See application file for complete search history.

(56) References Cited

U.S. PATENT DOCUMENTS

| | | | |
|---|---|---|---|
| 6,643,685 B1 | 11/2003 | Millard | |
| 6,909,518 B2 | 6/2005 | Miller et al. | |
| 7,054,906 B2 | 5/2006 | Levosky | |
| 7,228,301 B2 | 6/2007 | Meyerzon et al. | |
| 7,617,284 B2 | 11/2009 | Salamuniccar | |
| 7,703,023 B2 | 4/2010 | O'Mahony et al. | |
| 7,822,819 B1 | 10/2010 | Levosky | |
| 7,966,377 B2 | 6/2011 | Bauchot et al. | |
| 8,020,202 B2 | 9/2011 | Xie | |
| 8,434,143 B2 | 4/2013 | Xie | |
| 8,893,257 B2 | 11/2014 | Xie | |
| 9,072,677 B2 | 7/2015 | Hassan et al. | |
| 9,264,387 B2 | 2/2016 | Scholtes et al. | |
| 2003/0200334 A1* | 10/2003 | Grynberg | H04L 29/12066 709/245 |
| 2007/0299920 A1* | 12/2007 | Crespo | G06Q 30/0603 709/206 |
| 2009/0259725 A1* | 10/2009 | Rabinovich | G06Q 10/107 709/206 |
| 2018/0048612 A1* | 2/2018 | Le Jouan | H04L 67/20 |

\* cited by examiner

*Primary Examiner* — Huan V Doan
(74) *Attorney, Agent, or Firm* — Patrick D. Benedicto

(57) ABSTRACT

A system for detecting leakage of email addresses generates an alias email address that will be used by a user to register with a web service. The alias email address is an alias for a primary email address of the user, and is paired with the web service. The web service is included in a whitelist upon confirmation from the web service that the alias email address has been registered with the web service. Emails that are addressed to the alias email address and from the web service are forwarded to the primary email address. Emails that are addressed to the alias email address but is not from the web service are detected to be suspicious.

12 Claims, 6 Drawing Sheets

US 11,316,894 B1

SYSTEM AND METHOD FOR DETECTING LEAKAGE OF EMAIL ADDRESSES

BACKGROUND OF THE INVENTION

1. Field of the Invention

The present invention relates generally to cybersecurity, and more particularly but not exclusively to electronic mail ("email") security.

2. Description of the Background Art

Web services are service providers on the Internet. Examples of web services include social network platforms, e-commerce sites, news sites, gaming sites, etc. A web service may require a user to register by providing an email address. Unfortunately, the provided email address may be leaked from the web service to a third party, i.e., another entity other than the web service. The third party may be a cybercriminal who hacked the web service, a partner of the web service, or some other entity that the user has not authorized to use the provided email address. The leakage may result in receiving spam emails addressed to the provided email address.

SUMMARY

In one embodiment, a system for detecting leakage of email addresses generates an alias email address that will be used by a user to register with a web service. The alias email address is an alias for a primary email address of the user, and is paired with the web service. The web service is included in a whitelist upon confirmation from the web service that the alias email address has been registered with the web service. Emails that are addressed to the alias email address and from the web service are forwarded to the primary email address. Emails that are addressed to the alias email address but is not from the web service are detected to be suspicious.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
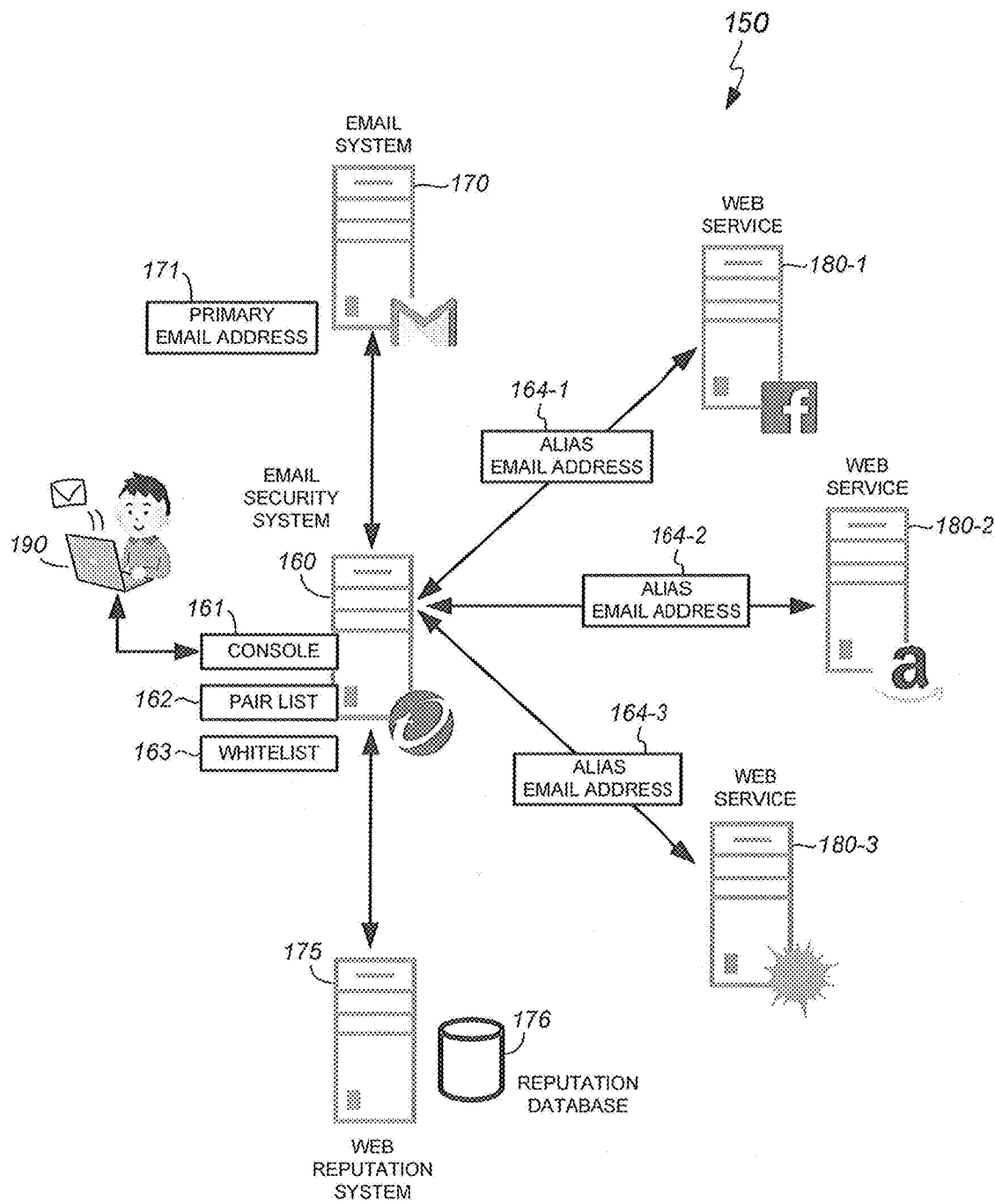
FIG. 1 shows a logical diagram of a system for detecting leakage of email addresses in accordance with an embodiment of the present invention.

FIG. 1 shows a logical diagram of a system 150 for detecting leakage of email addresses in accordance with an embodiment of the present invention. The computers shown in FIG. 1 may communicate over the Internet and other computer network.

An email system 170 may comprise an email server. A user may maintain an account with the email system 170 to send and receive emails. In the example of FIG. 1, a user that employs a user computer 190 maintains, with the email system 170, an email account having a primary email address 171. The user computer 190 may be a laptop computer, desktop computer, tablet, or other computing device.

An email security system 160 may comprise computer hardware and software that are configured to generate an alias email address for a primary email address and to detect leakage of the alias email address. The functionality of the email security system 160 described herein may be implemented in a single computer or distributed among several computers.

In the example of FIG. 1, the email security system 160 includes a pair list 162, a user whitelist 163, and a user interface in the form of a console 161. The console 161, pair list 162, and the whitelist 163 may be implemented in software. A user may employ his or her user computer 190 to communicate with the email security system 160 over a computer network, which in this example is over the Internet. For example, the console 161 may be implemented as a webpage that is accessed by the user by employing a web browser that is running on the user computer 190. As another example, the console 161 may be implemented as a user interface that communicates with a dedicated client software that runs on the user computer 190.

The user may employ the user computer 190 to connect to the console 161 to request the email security system 160 to generate an alias email address 164 (i.e., 164-1, 164-2, . . . ) that the user will use to register with a web service 180 (i.e., 180-1, 180-2, . . . ). The alias email address 164 is an alias for a primary email address 171, which the user maintains with the email system 170. In one embodiment, the email security system 160 is configured to receive, from the user, the primary email address 171 and the domain name of the web service. In one embodiment, the email security system 160 generates each alias email address 164 with a unique local-part (also referred to as "username") and/or a unique subdomain for each combination of user and web service. In one embodiment, an alias email address 164 has the following format:

"username@xxx.tmantil.com", where "username" is the local-part that is unique to the user-web service combination, "xxx" is the sub-domain that is unique to the user-web service combination, and "tmantil.com" is the domain name employed by the email security system 160 to receive emails that are addressed to the alias email address. In one embodiment, the email security system 160 is configured to pair an alias email address 164 with a single web service for which the alias email address will be registered, and indicate the pairing in the pair list 162. For example, an entry in the pair list 162 may have the following format:

12345@abc.tmantil.com, facebook.com, trend_taro@gmail.com, where "12345@abc.tmantil.com" is an alias email address for a primary email address "trend_taro@gmail.com", and the alias email address is to be registered with the FACEBOOK web service having the domain name "facebook.com". In that example, "12345@abc.tmantil.com" is paired with "facebook.com". Furthermore, the local-part "12345" and the subdomain "abc" are unique to the combination of the user and "facebook.com".

The web reputation system 175 may include a reputation database 176 that indicates the reputation of various domain names on the Internet. The web reputation system 175 may be maintained by a cybersecurity company, such as the Trend Micro, Incorporated. The reputation may indicate whether a domain name has a bad, good, suspicious (i.e., likely bad), or unknown reputation. The email security system 160 may be configured to consult the web reputation system 175 for a reputation of a domain name of a web service 180 that is to be paired with an alias email address 164, and to display the reputation of the domain name to the user. This advantageously allows the user to make an informed decision on whether or not to proceed with registering with the web service 180.

The user may use an alias email address 164 to register with a corresponding web service 180. In the example of FIG. 1, the email security system 160 generated, for the primary email address 171, an alias email address 164-1 to be registered with the web service 180-1, an alias email address 164-2 to be registered with the web service 180-2, and an alias email address 164-3 to be registered with the web service 180-3. As a particular example, the primary email address 171 of the user may be, "trend_taro@gmail.com", and the email security system 160 may generate corresponding alias email addresses "12345@abc.tmantil.com" that the user may register with the web service 180-1, "23456@def.tmantil.com" that the user may register with the web service 180-2, and "34567@ghi.tmantil.com" that the user may register with the web service 180-3. In the preceding examples, the email security system 160 uses the domain name "tmantil.com" to receive emails for the alias email addresses.

Upon receipt of a confirmation email from a web service 180 regarding registration of an alias email address 164, the email security system 160 may be configured to include the web service 180 (e.g., domain name of the web service 180) in the whitelist 163 of the user. In one embodiment, emails that are addressed to an alias email address 164 and from a web service 180 indicated in the whitelist 163 are forwarded to the primary email address 171.

In one embodiment, the email security system 160 is configured to receive all emails that are addressed to an alias email address 164. In response to receiving an email that is addressed to the alias email address 164, the email security system 160 is configured to forward the email to the primary email address 171 when the email is from the associated web service 180 that is paired with the alias email address 164. In one embodiment, an email that is addressed to the alias email address 164 but is not from the paired web service 180 is detected to be suspicious. In that case, the user may be alerted to give the user an opportunity to block or allow the suspicious email.

Figure 2:
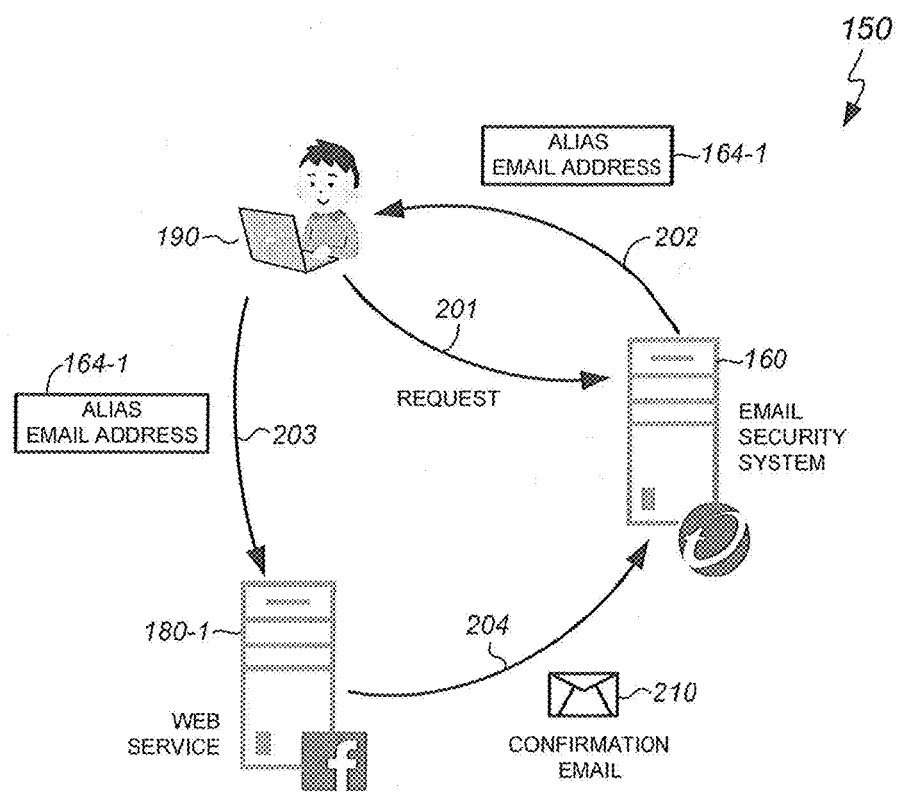
FIG. 2 shows a logical diagram that illustrates a method of pairing an alias email address with a web service in accordance with an embodiment of the present invention.

FIG. 2 shows a logical diagram that illustrates a method of pairing an alias email address with a web service in accordance with an embodiment of the present invention. The method of FIG. 2 is explained using the system 150 of FIG. 1 as an example.

In the example of FIG. 2, the user communicates with the email security system 160 by way of the user computer 190. The user requests the email security system 160 to generate an alias email address for the user's primary email address 171 (see 201). The request may include the primary email address 171 and the domain name of the web service 180-1 that the user will register with. In response to the request, the email security system 160 generates an alias email address 164-1 and provides the alias email address 164-1 to the user (see arrow 202). The email security system 160 indicates the pairing, i.e., the alias email address 164-1 and the domain name of the web service 180-1, in the pair list 162. The user thereafter registers with the web service 180-1, providing the alias email address 164-1 to the web service 180-1 (see arrow 203). To complete the registration process, the web service 180-1 sends a confirmation email 210 to the alias email address 164-1 (see arrow 204), which is received by the email security system 160. The confirmation email 210 has a sender address indicating that the confirmation email 210 is from the web service 180-1, such as the sender address having the domain name of the web service 180-1. As can be appreciated, confirmation emails, especially those from well-known web services, have tell-tale signs that can be detected. In response to receiving the confirmation email 210 from the web service 180-1, the email security system 160 includes the domain name of the web service 180-1 in the whitelist 163 of the user.

Figure 3:
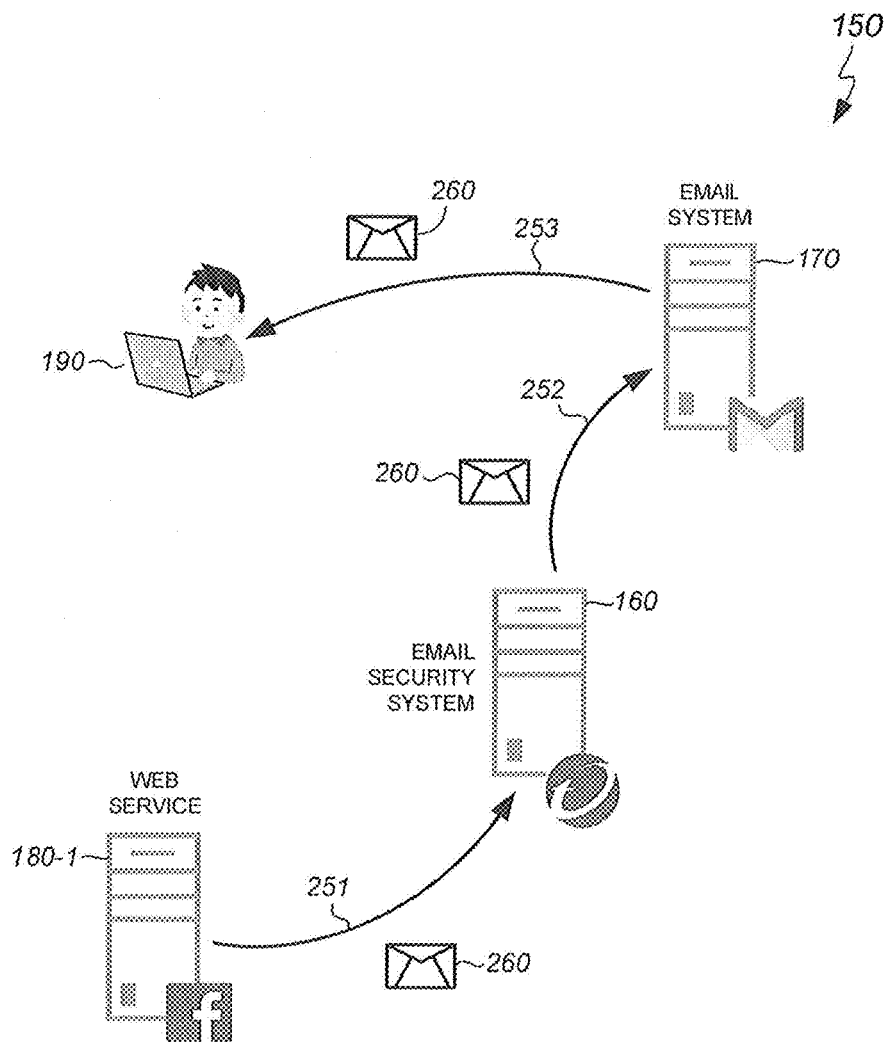
FIG. 3 shows a logical diagram that illustrates a method of forwarding an email, which is addressed to an alias email address and is from a paired web service, to a primary email address in accordance with an embodiment of the present invention.

FIG. 3 shows a logical diagram that illustrates a method of forwarding an email, which is addressed to an alias email address and is from a paired web service, to a primary email address in accordance with an embodiment of the present invention. The method of FIG. 3 is explained using the system 150 of FIG. 1 as an example.

In the example of FIG. 3, after the user has registered with the web service 180-1, the web service 180-1 sends an email 260 that is addressed to the alias email address 164-1 (see arrow 251). The email security system 160 receives the email 260, and detects that the email 260 is sent by the web service 180-1 that has been paired with the alias email address 164-1. For example, the email security system 160 may consult the pair list 162 to find that the alias email address 164-1 has been paired with a domain name that matches the sender address of the email 260. As another example, the email security system 160 may consult the whitelist 163 to find that the domain name in the sender address of the email 260 has been whitelisted, i.e. the domain name is associated with a sender that has been approved by the user. In either case, the email security system 160 forwards the email 260 to the primary email address 171 (see arrow 252), which is for an email account in the email system 170. Accordingly, the email 260 is received by the email system 170 (see arrow 252). Subsequently, the user may employ the user computer 190 to receive the email 260 from the email system, 170 (see arrow 253).

Figure 4:
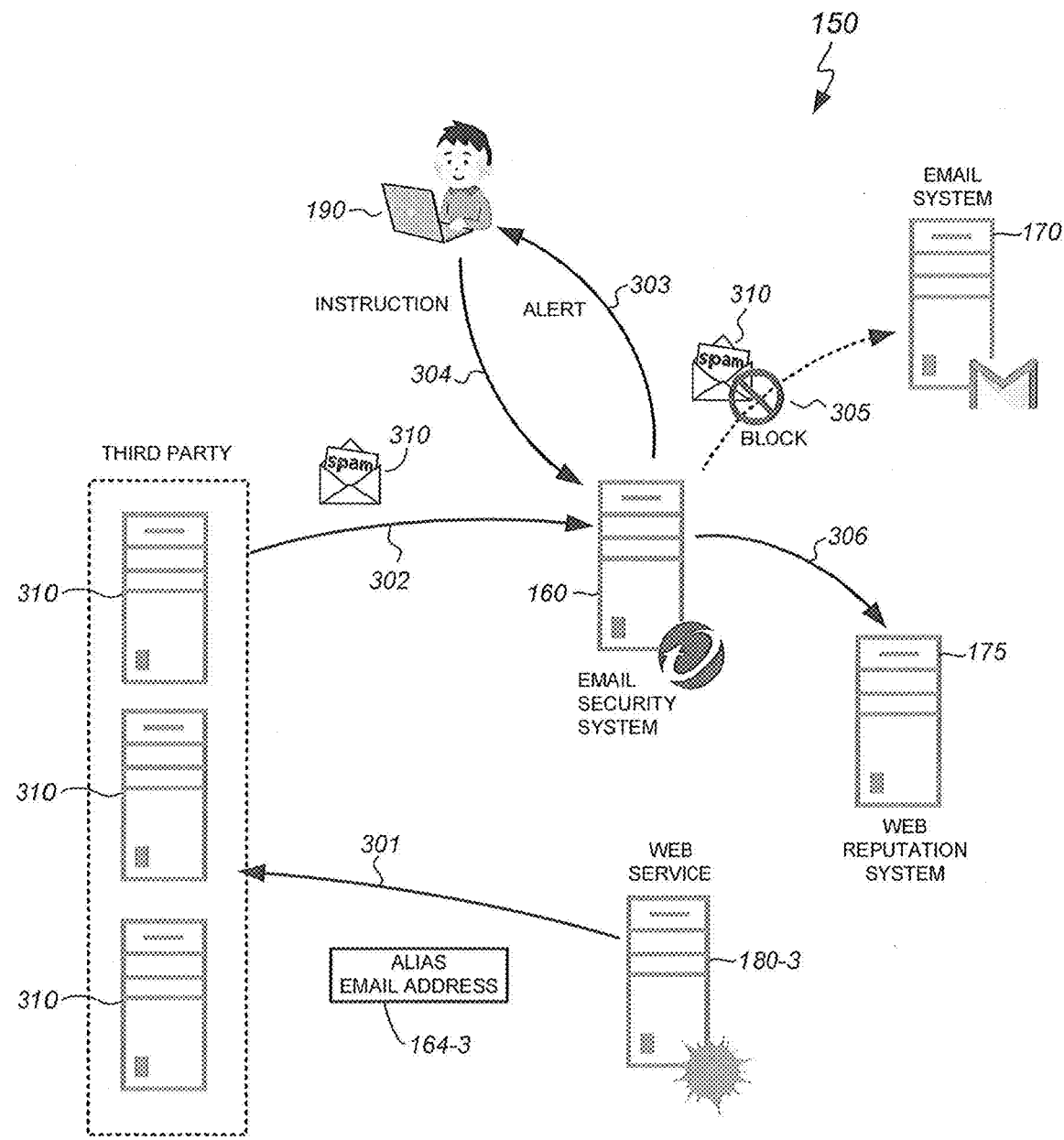
FIG. 4 shows a logical diagram that illustrates a method of detecting leakage of an alias email address in accordance with an embodiment of the present invention.

FIG. 4 shows a logical diagram that illustrates a method of detecting leakage of an alias email address in accordance with an embodiment of the present invention. The method of FIG. 4 is explained using the system 150 of FIG. 1 as an example.

In the example of FIG. 4, the email security system 160 generated an alias email address 164-3 for the primary email address 171, and the alias email address 164-3 has been paired with the web service 180-3 as in the method of FIG. 2. Unfortunately, the alias email address 164-3 has been leaked out of the web service 180-3 (see arrow 301) and into one or more computers of third parties 310. A third party 310 is a "third party" in that the user has not authorized the third party 310 to receive and use the alias email address 164-3. The leakage may be intentional, as is the case when the web service 180-3 sells or otherwise shares the alias email address 164-3 without the user's authorization. The leakage may also be unintentional, such as when a cybercriminal hacks the web service 180-3.

In the example of FIG. 4, a third party 310 sends a spam email 310 that is addressed to the alias email address 164-3 (see arrow 302), which is received by the email security system 160. The spam email 310 has a sender address that does not have the domain name of the web service 180-3. Accordingly, the email security system 160 detects, e.g., by consulting the pair list 162, that the spam email 310 is not from a web service that has been paired with the alias email address 164-3, and is thus suspicious. In response, the email security system 160 sends an alert to the user, indicating reception of the spam email 310 that is addressed to the alias email address 164-3 but is not from the web service 180-3 (see arrow 303). The alert may be in the form of an email (e.g., addressed to the primary email address 171 of the user), text message to the user's registered mobile phone number, or other messaging means.

In response to receiving the alert, the user may send an instruction to the email security system 160 (see arrow 304), indicating whether or not the user wants to receive the spam email 310. The user may send the instruction by employing the user computer 190 to logon to the email security system 160 or by replying to the alert, for example. The user may indicate in the instruction that the spam email 310 is indeed spam, i.e., unsolicited email that is not wanted by the user. In response to the user indicating that the spam email 310 is indeed spam, the email security system 160 may be configured to block the spam email 310 (see action 305), thereby preventing the spam email 310 from being forwarded to the email system 170.

In one embodiment, when the user indicates that the spam email 310 is indeed spam, the email security system 160 is configured to report to the web reputation system 175 that the web service 180-3 is suspicious (see arrow 306). In response, the web reputation system 175 may assign a suspicious reputation to the domain name of the web service 180-3 to alert other users to be wary of the web service 180-3.

Receiving an email that is addressed to an alias email address but the email is not from a web service paired with the alias email address indicates that the alias email address has been leaked. In the example of FIG. 4, the user has been alerted of the spam email 310, indicating to the user that the alias email address 164-3 has somehow been leaked from the web service 180-3. In response, the user may complain to the web service 180-3 and/or re-register a new alias email address 164 with the web service 180-3. The user may also simply stop using the web service 180-3, in which case the user may instruct the email security system 160 to remove the web service 180-3 from the whitelist 163. As can be appreciated, the user may choose his or her preferred option for dealing with the leakage, and that option may be based on the circumstances of the user and the particulars of the web service.

It is also possible that the spam email 310 is acceptable to the user, and the user may so indicate in the instruction to the email security system 160. In response to the instruction indicating that the user wants the spam email 310, the email security system 160 may be configured to forward the spam email 310 to the email system 170 as in the example of FIG. 3.

Figure 5:
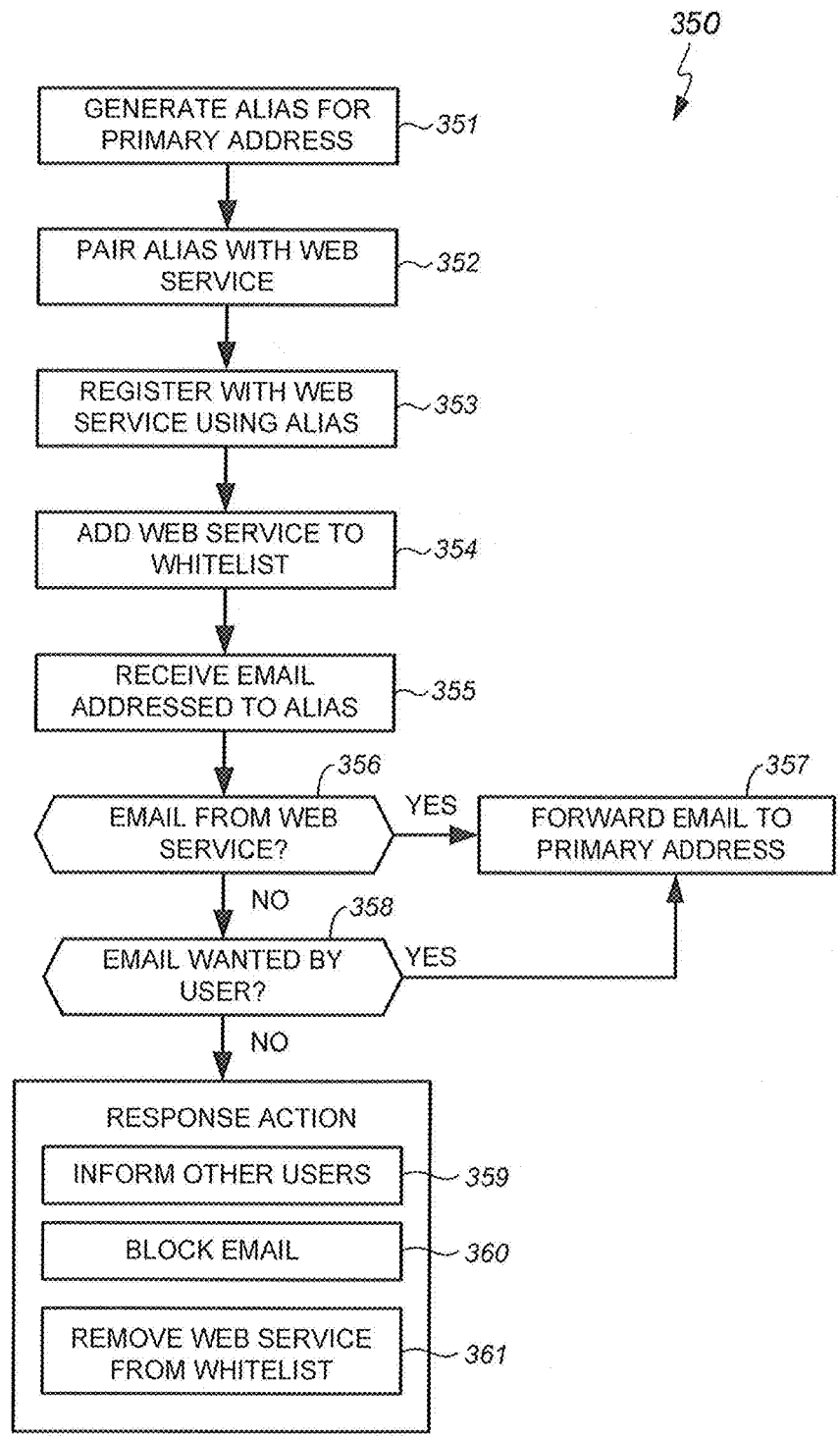
FIG. 5 shows a flow diagram of a method of detecting leakage of email addresses in accordance with an embodiment of the present invention.

FIG. 5 shows a flow diagram of a method 350 of detecting leakage of email addresses in accordance with an embodiment of the present invention. The method 350 is explained using the components of the system 150 for illustration purposes only. Other components may also be employed without detracting from the merits of the present invention.

In the example of FIG. 5, a user wants to access a web service, but does not want to use his or her primary email address to register with the web service. Accordingly, the user requests an email security system to generate an alias email address for the primary email address. The request includes the primary email address and an identifier of the web service, which in this example is the domain name of the web service. The email security system generates the alias email address for the primary email address (step 351) and pairs the alias email address with the web service (step 352). The alias email address may have at least a local-part that is unique for each combination of user and web service. The alias email address may also have a local-part and subdomain that are unique for each combination of user and web service. In one embodiment, the alias email address is paired only with a single web service. Any email that is addressed to the alias email address but is not from the paired web service will be detected by the email security system as suspicious.

The email security system provides the alias email address to the user, who then registers with the web service using the alias email address (step 353). Upon receipt of confirmation from the web service that the alias email address has been registered with the web service, the email security system adds the web service (e.g., domain name) of the web service to a whitelist of the user (step 354).

In response to receiving an email that is addressed to the alias email address (step 355), the email security system checks if the email is from the web service that has been paired with the alias email address (step 356). If so (step 356, YES branch), the email security system forwards the email to the user's primary email address (step 357).

Otherwise, if the email is not from the paired web service (step 356, NO branch), the email security system sends an alert to the user. The alert informs the user of the email, which is addressed to the alias email address but is not from the paired web service. The alert asks the user whether or not the user wants the email (step 358). If the user wants the email (step 358, YES branch), the email security system forwards the email to the primary email address (step 357).

Otherwise, if the user does not want the email (step 358, NO branch), the email security system deems the email to be spam. In that case, the email security system may perform one or more response actions against the email. For example, the email security system may perform a response action to inform other users that the web service may leak email addresses (step 359), such as by giving the web service a suspicious reputation and/or warn other users who are in the process of requesting an alias email address for use with the web service. As another example, the email security system or other cybersecurity system may block the email and all other emails from the sender of the email (step 360). Yet another example, the email security system may remove the web service from the whitelist of the user (step 361). As can be appreciated, the response action against the email may be varied depending on the cybersecurity application.

Figure 6:
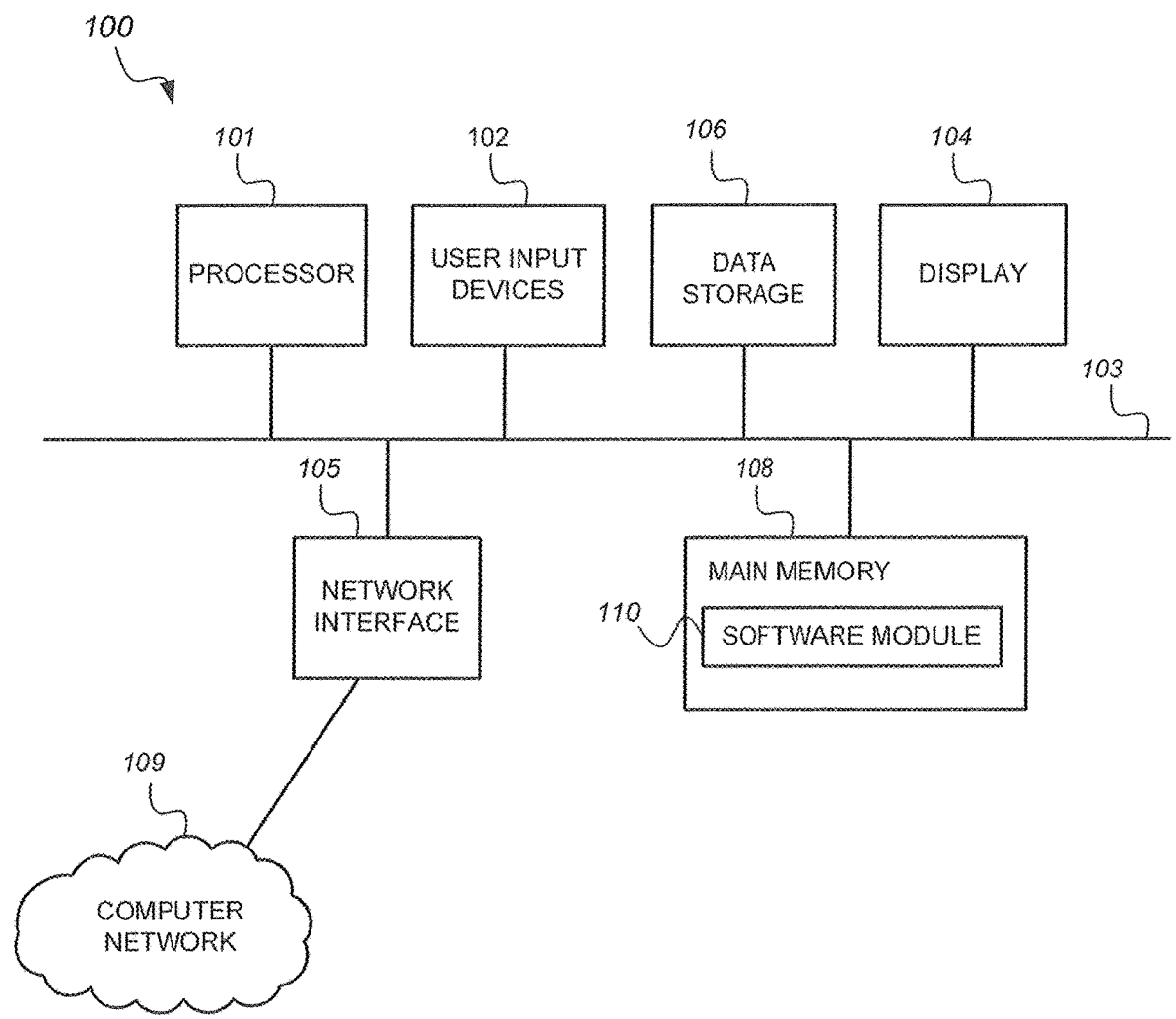
FIG. 6 shows a logical diagram of a computer system that may be employed with embodiments of the present invention.

Referring now to FIG. 6, there is shown a logical diagram of a computer system 100 that may be employed with embodiments of the present invention. The computer system 100 may be employed as an email security system or other computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory on the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

Systems and methods for detecting leakage of email addresses have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting leakage of email addresses, the method comprising:
   receiving a request for an alias email address that will be registered by a user with a web service, the alias email address being an alias for a primary email address;
   in response to receiving the request, generating the alias email address and pairing the alias email address for use only with the web service;
   receiving a confirmation email from the web service, the confirmation email indicating that the alias email address has been registered by the user with the web service;
   in response to receiving the confirmation email, adding the web service to a whitelist;
   receiving a first email, the first email being addressed to the alias email address and being from the web service;
   forwarding the first email to the primary email address;
   receiving a second email;
   detecting that the second email is suspicious in response to the second email being addressed to the alias email address but is not from the web service;
   in response to the second email being detected as suspicious, asking the user whether or not the user wants to receive the second email;
   in response to the user not wanting to receive the second email, blocking the second email;
   in response to the user not wanting to receive the second email, alerting other users that the web service is suspicious; and
   in response to the user not wanting to receive the second email, removing the web service from the whitelist.

2. The method of claim 1, wherein the alias email address has a local-part and a subdomain that are unique to a combination of the user and the web service.

3. The method of claim 1, further comprising:
   in response to the user wanting to receive the second email, forwarding the second email to the primary email address.

4. The method of claim 1, wherein alerting other users that the web service is suspicious includes giving a suspicious reputation to the web service.

5. A non-transitory computer-readable storage medium storing instructions that, when executed by a processor, cause a computer system to perform a method of detecting leakage of email addresses, the method comprising:
   receiving a request for an alias email address that will be registered by a user with a web service, the alias email address being an alias for a primary email address;
   in response to receiving the request, generating the alias email address and pairing the alias email address for use only with the web service;
   receiving a confirmation email from the web service, the confirmation email indicating that the alias email address has been registered by the user with the web service;
   in response to receiving the confirmation email, adding the web service to a whitelist;
   receiving a first email, the first email being addressed to the alias email address and being from the web service;
   forwarding the first email to the primary email address;
   receiving a second email;
   detecting that the second email is suspicious in response to the second email being addressed to the alias email address but is not from the web service;
   in response to the second email being detected as suspicious, asking the user whether or not the user wants to receive the second email;
   in response to the user not wanting to receive the second email, blocking the second email;
   in response to the user not wanting to receive the second email, alerting other users that the web service is suspicious; and
   in response to the user not wanting to receive the second email, removing the web service from the whitelist.

6. The non-transitory computer-readable storage medium of claim 5, wherein the alias email address has a local-part and a subdomain that are unique to a combination of the user and the web service.

7. The non-transitory computer-readable storage medium of claim 5, wherein the method further comprises:
   in response to the user wanting to receive the second email, forwarding the second email to the primary email address.

8. The non-transitory computer-readable storage medium of claim 5, wherein alerting other users that the web service is suspicious includes giving a suspicious reputation to the web service.

9. A computer system for detecting leakage of email addresses, the computer system comprising:
   at least one processor; and
   a memory;

wherein the memory storing instructions that, when executed by the at least one processor, cause the computer system to:

receive a request for an alias email address that will be registered by a user with a web service, the alias email address being an alias for a primary email address;

in response to receiving the request, generate the alias email address and pair the alias email address for use only with the web service;

receive a confirmation email from the web service, the confirmation email indicating that the alias email address has been registered by the user with the web service;

in response to receiving the confirmation email, add the web service to a whitelist;

receive a first email, the first email being addressed to the alias email address and being from the web service;

forward the first email to the primary email address;

receive a second email;

detect that the second email is suspicious in response to the second email being addressed to the alias email address but is not from the web service;

in response to the second email being detected as suspicious, ask the user whether or not the user wants to receive the second email;

in response to the user not wanting to receive the second email, block the second email;

in response to the user not wanting to receive the second email, alert other users that the web service is suspicious; and in response to the user not wanting to receive the second email, remove the web service from the whitelist.

10. The computer system of claim 9, wherein the alias email address has a local-part and a subdomain that are unique to a combination of the user and the web service.

11. The computer system of claim 9, wherein the instructions stored in the memory, when executed by the at least one processor, cause the computer system to:

in response to the user wanting to receive the second email, forward the second email to the primary email address.

12. The computer system of claim 9, wherein alerting other users that the web service is suspicious includes giving a suspicious reputation to the web service.

* * * * *